(12) United States Patent
Watson et al.

(10) Patent No.: US 11,128,432 B2
(45) Date of Patent: Sep. 21, 2021

(54) ANTENNA SYSTEM

(71) Applicant: Huawei Technologies Co., Ltd., Shenzhen (CN)

(72) Inventors: Paul Robert Watson, Ottawa (CA); Wen Tong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 75 days.

(21) Appl. No.: 16/585,132

(22) Filed: Sep. 27, 2019

(65) Prior Publication Data

US 2021/0099276 A1    Apr. 1, 2021

(51) Int. Cl.
*H04L 5/14* (2006.01)
*H04B 15/00* (2006.01)
*H01Q 1/52* (2006.01)

(52) U.S. Cl.
CPC .......... *H04L 5/1461* (2013.01); *H01Q 1/525* (2013.01); *H04B 15/00* (2013.01)

(58) Field of Classification Search
None
See application file for complete search history.

(56) References Cited

U.S. PATENT DOCUMENTS

| 2011/0129047 | A1 | 6/2011 | Mashino et al. |
| 2016/0112111 | A1* | 4/2016 | Bull ............ H01Q 3/267 455/63.4 |
| 2017/0317809 | A1* | 11/2017 | Khandani ........ H01Q 19/108 |

FOREIGN PATENT DOCUMENTS

| CN | 103885041 A | 6/2014 |
| CN | 105259542 A | 1/2016 |
| CN | 106054144 A | 10/2016 |
| CN | 106154234 A | 11/2016 |

OTHER PUBLICATIONS

Widrow et al. "Adaptive Antenna Systems" Proceedings of the IEEE vol. 55 No. 12, Dec. 1967 1967.

Howells "Explorations in Fixed and Adaptive Resolution at GE and SURC" IEEE Transactions on antennas and propagation vol. 24 No. 5, Sep. 1976 1976.

* cited by examiner

*Primary Examiner* — Ruihua Zhang
(74) *Attorney, Agent, or Firm* — Slater Matsil, LLP

(57) ABSTRACT

An antenna system is described. A main antenna may be configured to receive a first signal, and a first auxiliary antenna may be configured to receive a second signal from a first expected interference direction. An adjustment unit receives the second signal and is configured to adjust the second signal. A combiner unit receives the first signal and the adjusted second signal and is configured to combine the adjusted second signal with the first signal to reduce any contribution of the second signal to the first signal.

20 Claims, 9 Drawing Sheets

ANTENNA SYSTEM

FIELD

The present disclosure is related to an antenna system, which enables full duplex operation.

BACKGROUND

In antenna systems, one goal of a main antenna is usually to receive an intended signal with as much signal strength as possible.

In practice, multiple antenna systems are often co-resident on a single antenna tower (e.g., a single base station), and therefore the main antenna of one antenna system may receive unwanted interference from antenna tower co-residents. In some cases the multiple antenna systems may be associated with different carriers. The main antenna may also receive unwanted signals from other sources not located on the antenna tower.

Modern antenna systems have incorporated a variety of techniques to filter unwanted signals out of the signal received by the main antenna. Conventional approaches to achieving this goal include signal processing techniques on the digitized signal typically requiring complex algorithms to discount any interference, and uses of technologies such as beamforming to direct the beam of the main antenna in the direction of a desired signal to avoid unwanted interference.

There is a need for a more accurate and/or efficient means of removing the amount of unwanted signal from the signal received by the main antenna.

SUMMARY

In a first aspect, the present disclosure describes an antenna system comprising a main antenna, configured to receive a first signal, a first auxiliary antenna, configured to receive a second signal from a first expected interference direction, an adjustment unit in communication with the first auxiliary antenna to receive the second signal and adapted to adjust the second signal, and a combiner unit, in communication with the main antenna to receive the first signal, and in communication with the adjustment unit to receive the adjusted second signal, the combiner unit being configured to combine the adjusted second signal with the first signal, to reduce any contribution of the second signal to the first signal.

The antenna system may configure the first auxiliary antenna to be positioned, relative to the main antenna, to receive a stronger second signal.

The antenna system may further comprise a second adjustment unit, wherein the second adjustment unit is in communication with the main antenna to receive the first signal, and adjusts the first signal, prior to providing the signal to the combiner unit.

The antenna system may comprise the main antenna being an antenna array and the first auxiliary antenna being an array element of the main antenna.

The main antenna of antenna system may be a duplex transceiver and the first auxiliary antenna is a receiving antenna.

The antenna system may further comprise a second auxiliary antenna configured to receive a third signal from a second expected interference direction. The adjustment unit is in communication with the second auxiliary antenna to receive and adjust the third signal, and the combiner unit is in communication with the adjustment unit to receive the adjusted third signal and further configured to reduce any contribution of the third signal to the first signal.

The second auxiliary of the antenna system may be positioned, relative to the main antenna and relative to the first auxiliary antenna, to receive a stronger third signal.

The antenna system may comprise the adjustment unit being configured to adjust the second signal by applying a phase shift based on a distance between the main antenna and first auxiliary antenna.

The antenna system may comprise the adjustment unit being configured to adjust the second signal by applying a gain adjustment to the second signal based on the distance between the main antenna and first auxiliary antenna.

The antenna system may comprise the adjustment unit being configured to adjust the second signal by applying a time delay to the second signal based on the distance between the main antenna and first auxiliary antenna.

The antenna system adjustment unit may comprise a gain unit, a phase shifter, and a delay unit.

The antenna system wherein the adjustment unit is configured to adjust the second signal based on the distance between the main antenna and the first auxiliary antenna.

The antenna system may comprise the first signal being communicated to the combiner via a length of connector that causes the first signal to be received at the combiner as a delayed first signal having a time delay, the time delay of the delayed first signal being selected to cause the adjusted second signal to be reduced from the delayed first signal when combined.

The antenna system first auxiliary antenna may be directed towards the first expected interference direction away from an expected source of the first signal.

The antenna system adjustment unit may be collocated with the combiner unit.

The antenna system auxiliary antenna may be attached to a sideport of the main antenna.

In a second aspect, an antenna system may comprise an antenna array, and a control unit in communication with the antenna array. The antenna array may be configured by the control unit to produce a main receiving lobe and an interference receiving lobe, the main receiving lobe being directed to receive a first signal, and the interference receiving lobe being directed to receive a second signal from a first expected interference direction. An adjustment unit may be in communication with the antenna array, and configured to receive and adjust the second signal, and a combiner unit, in communication with the adjustment unit and the antenna array, may be configured to combine the adjusted second signal with the first signal, to reduce any contribution of the second signal to the first signal.

The antenna adjustment unit, may be collocated with the control unit and the combiner unit.

The antenna adjustment unit may comprise at least a gain unit.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure describes examples that may be used to implement an antenna system. Examples described herein may help increase signal quality when operating a duplex transceiver by more effectively cancelling over the air interference from interference transmitters in a more cost effective manner.

A typical antenna tower, or other physical structure for antenna installation, may contain a plurality of physically adjacent base station antenna arrays. These antenna arrays can generate mutually-interfering transmit signals as a result of, for example, being operated by different service providers, which may make full duplex operation impossible or difficult.

Full duplex technology enables transmission and reception of radio signals using a common antenna and transceiver. In full duplex communications, transmission signals and reception signals are communicated using the same time-frequency resource (e.g., using the same carrier frequency at the same time). Full duplex communication offers the possibility of doubling the communication capacity on a given bandwidth. However, in full duplex communication, management and mitigation of interfering signals is important to maintain acceptable signal-to-noise ratio (SNR) of received signals.

Where a main antenna of one antenna system has access to the interfering signal caused by another antenna system, various conventional techniques can be used to accomplish full duplex cancellation (e.g., in analog or digital domain). In other cases, the main antenna has no access to the interfering signal (e.g., as mentioned above, wherein the transmitting antennas are operated by different service providers), or it is not convenient for the main antenna to be provided with or to access the interfering signals. In such cases, there is currently no conventional method of reducing the interference signal.

The interference signals in this scenario may preclude full duplex communication, and this interference may be particularly of concern where there is adjacent frequency channel interference.

The present application describes examples of an antenna system adapted to sample interference signals transmitted over the air from adjacent base station antenna arrays. The sampled interference signal may be an interfering signal in a frequency channel adjacent to the full duplex frequency channel of the main antenna.

In examples described herein, the antenna system samples the over-the-air interfering signal and may include one or more auxiliary antenna elements in addition to the main antenna. The antenna system may sample the over-the-air interfering signal using an auxiliary antenna that has higher gain in the direction of an interference signal. The sample of the interfering signal is sent to nulling circuitry, to reduce the magnitude of this interfering signal present in the desired signal received via the main antenna.

Figure 1:
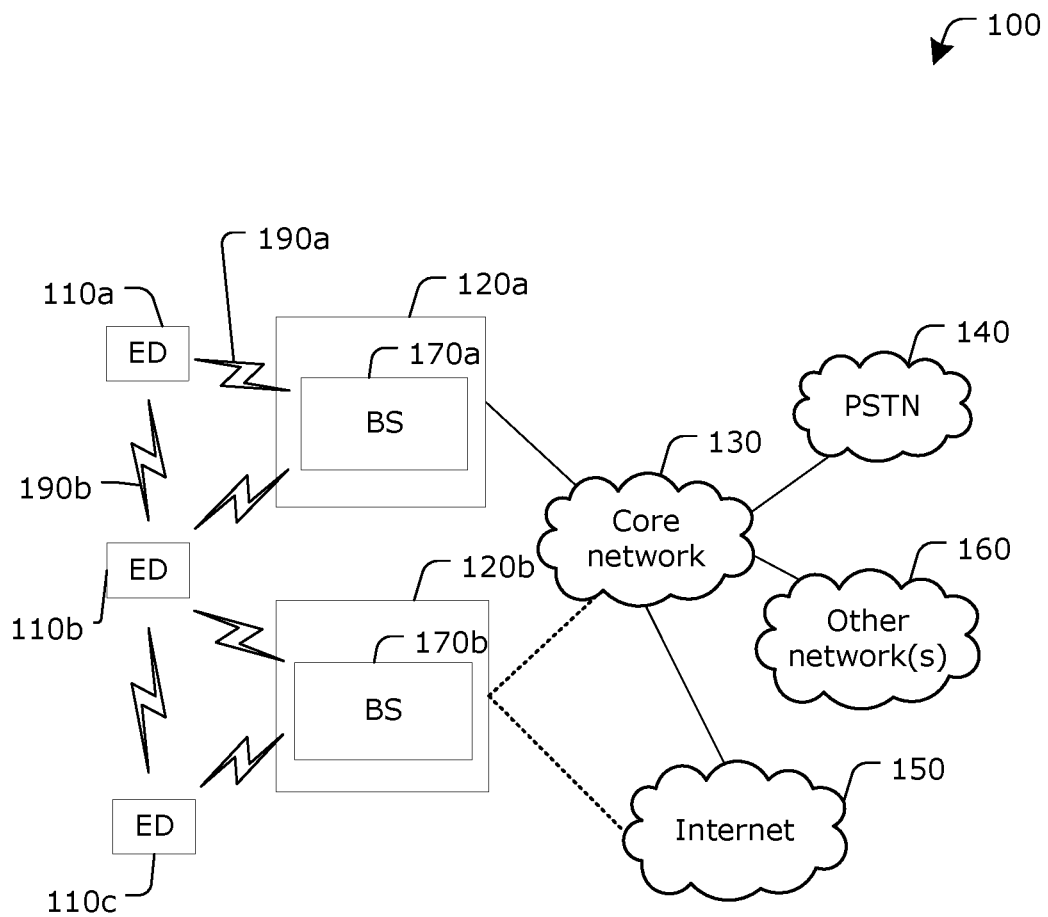
FIG. 1 is a schematic diagram of an example communication system suitable for implementing examples described herein.

FIG. 1 illustrates an example wireless communication system 100 (also referred to as wireless system 100) in which embodiments of the present disclosure could be implemented. In general, the wireless system 100 enables multiple wireless or wired elements to communicate data and other content. The wireless system 100 may enable content (e.g., voice, data, video, text, etc.) to be communicated (e.g., via broadcast, narrowcast, user device to user device, etc.) among entities of the system 100. The wireless system 100 may be suitable for wireless communications using 5G technology and/or later generation wireless technology (e.g., 6G or later). In some examples, the wireless system 100 may also accommodate some legacy wireless technology (e.g., 3G or 4G wireless technology). Wireless communication may be accomplished utilizing an antenna system, as described below.

In the example shown, the wireless system 100 includes electronic devices (ED) 110a-110c (generically referred to as ED 110), radio access networks (RANs) 120a-120b (generically referred to as RAN 120), a core network 130, a public switched telephone network (PSTN) 140, the internet 150, and other networks 160. In some examples, one or more of the networks may be omitted or replaced by a different type of network. Other networks may be included in the wireless system 100. Although certain numbers of these components or elements are shown in FIG. 1, any reasonable number of these components or elements may be included in the wireless system 100.

The EDs 110 are configured to operate, communicate, or both, in the wireless system 100. For example, the EDs 110 may be configured to transmit, receive, or both via wireless communication channels. Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, or a consumer electronics device, among other possibilities. Future generation EDs 110 may be referred to using other terms.

In FIG. 1, the RANs 120 include base stations (BSs) 170a-170b (generically referred to as BS 170), respectively. Each BS 170 is configured to wirelessly interface with one or more of the EDs 110 to enable access to any other BS 170, the core network 130, the PSTN 140, the internet 150, and/or the other networks 160.

For example, the BS 170s may include (or be) one or more of several well-known devices, such as a base transceiver station (BTS), a radio base station, a Node-B (NodeB), an evolved NodeB (eNodeB or eNB), a Home eNodeB, a gNodeB (sometimes called a next-generation Node B or gNB), a transmission point (TP), a transmit and receive point (TRP), a site controller, an access point (AP), or a wireless router, among other possibilities. Future generation BSs 170 may be referred to using other terms. An ED 110 may be alternatively or additionally configured to interface with, access, or communicate with any other BS 170, the internet 150, the core network 130, the PSTN 140, the other networks 160, or any combination of the preceding using the antenna system of the present disclosure. The wireless system 100 may include RANs, such as RAN 120b, wherein the corresponding BS 170b accesses the core network 130 via the internet 150, as shown.

The BSs 170 are examples of communication equipment that can be configured to implement some or all of the functionality and/or embodiments of the antenna system described herein. In the embodiment shown in FIG. 1, the BS 170a forms part of the RAN 120a, which may include other BSs, base station controller(s) (BSC), radio network controller(s) (RNC), relay nodes, elements, and/or devices. Any BS 170 may be a single element, as shown, or multiple elements, distributed in the corresponding RAN, or otherwise. Also, the BS 170b forms part of the RAN 120b, which may include other BSs, elements, and/or devices. Each BS 170 transmits and/or receives wireless signals within a particular geographic region or area, sometimes referred to as a "cell" or "coverage area". A cell may be further divided into cell sectors, and a BS 170 may, for example, employ multiple transceivers to provide service to multiple sectors. In some embodiments there may be established pico or femto cells where the radio access technology supports such. A macro cell may encompass one or more smaller cells. In some embodiments, multiple transceivers could be used for each cell, for example using multiple-input multiple-output (MIMO) technology. The number of RANs 120 shown is exemplary only. Any number of RANs may be contemplated when devising the wireless system 100.

The BSs 170 communicate with one or more of the EDs 110 over one or more air interfaces 190a using wireless communication links (e.g. radio frequency (RF), microwave, infrared (IR), etc.) utilizing the antenna system described herein. The EDs 110 may also communicate directly with one another via one or more sidelink air interfaces 190b. The interfaces 190a and 190b may be generally referred to as air interfaces 190. BS-ED communications over interfaces 190a and ED-ED communications over interfaces 190b may use similar communication technology. For example, the polarization stream architecture disclosed herein may be used for BS-ED communications and may also be used for ED-ED communications. The air interfaces 190 may utilize any suitable radio access technology. For example, the wireless system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190. In accordance with examples described herein, the air interfaces 190 may utilize other higher dimension signal spaces, which may involve a combine of orthogonal and/or non-orthogonal dimensions.

The RANs 120 are in communication with the core network 130 to provide the EDs 110 with various services such as voice, data, and other services. The RANs 120 and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120 or EDs 110 or both, and (ii) other networks (such as the PSTN 140, the internet 150, and the other networks 160). In addition, some or all of the EDs 110 may include functionality for communicating with different wireless networks over different wireless links using different wireless technologies and/or protocols. Instead of wireless communication (or in addition thereto), the EDs 110 may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), and User Datagram Protocol (UDP). EDs 110 may be multimode devices capable of operation according to multiple radio access technologies, and incorporate multiple transceivers necessary to support such.

Figure 2:
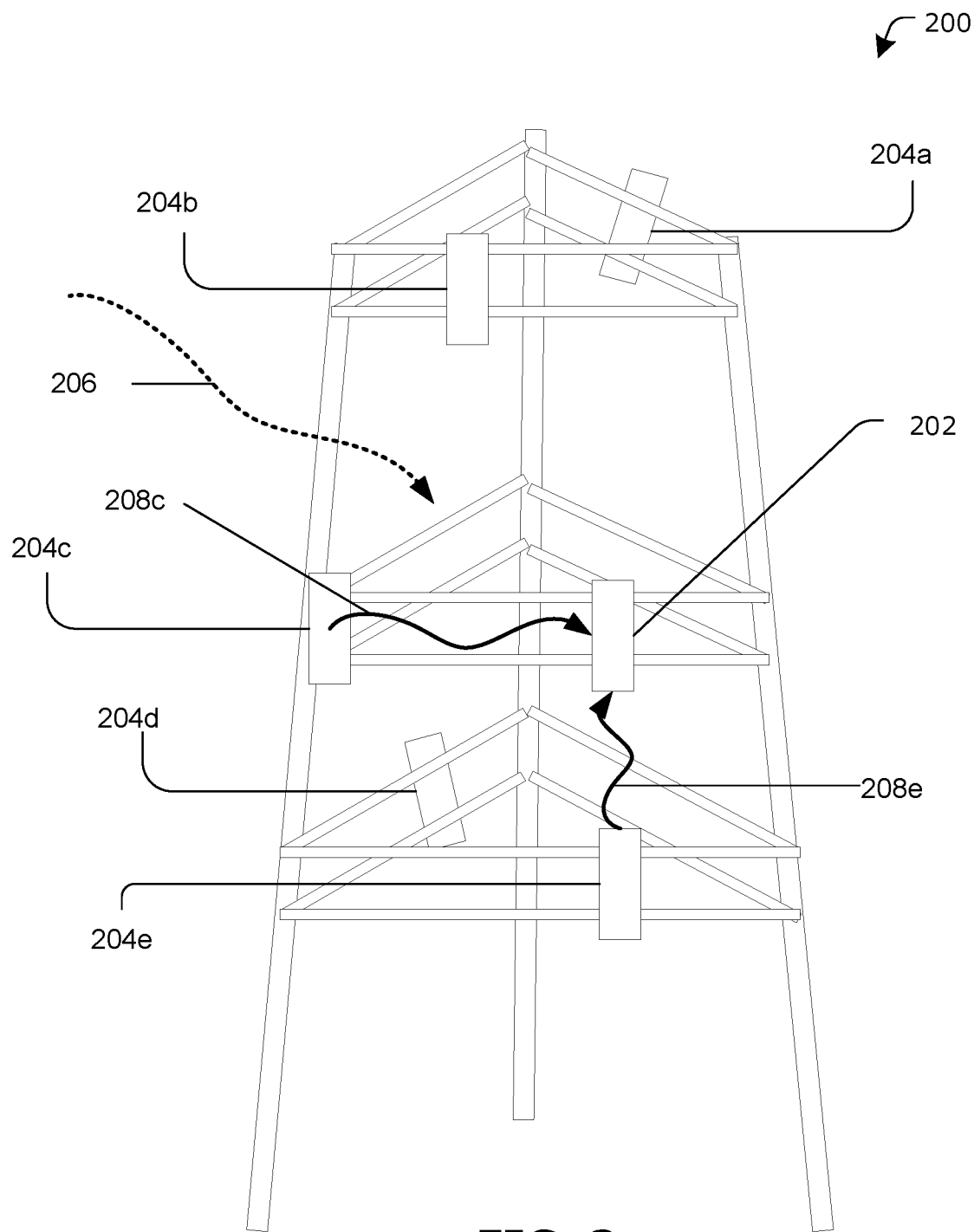
FIG. 2 illustrates an example antenna tower with interfering transmitters and a first signal to be received by a main antenna.

FIG. 2 illustrates an example embodiment of an antenna tower 200 supporting a conventional main antenna and nearby interfering antennas. Although FIG. 2 illustrates an antenna tower 200, it should be understood that the antennas may be supported by any physical structure, including buildings or poles, and neighboring antennas need not be supported by the same physical structure. In the example shown, the antenna tower 200 supports a first, second, third, fourth and fifth interfering transmitter antennas, respectively 204a, 204b, 204c, 204d, 204e (hereinafter generally referred to as the interfering transmitters 204), and a conventional main antenna 202.

Each antenna depicted in FIG. 2 may include a conventional array of antenna elements arranged on top of a single reflector, with relatively high gain near boresight (e.g., aimed at a cellular sector), and relatively low gain near the radome plane.

The interfering transmitters 204 may be configured to operate in channels adjacent to the channel being utilized by the main antenna 202, creating interference. Main antenna 202 is configured to capture a desired signal 206. The configuration could include any combination of placement relative to the source of the desired signal, and where the conventional main antenna 202 is an antenna array, the configuration may include using beamforming to direct the conventional main antenna 202 in the direction of higher path gain of the desired signal 206.

The third and fifth interfering transmitters 204c, 204e in the example embodiment generate unwanted signals, shown as a second signal 208c and a third signal 208e, respectively. The desired signal 206, the second signal 208c and the third signal 208e may all be received by the conventional main antenna 202, and collectively form the "first signal." The first signal may be composed of any number of desired signals such as the desired signal 206, and undesired signals such the second signal 208c and the third signal 208e, which are received by the conventional main antenna 202.

Figure 3:
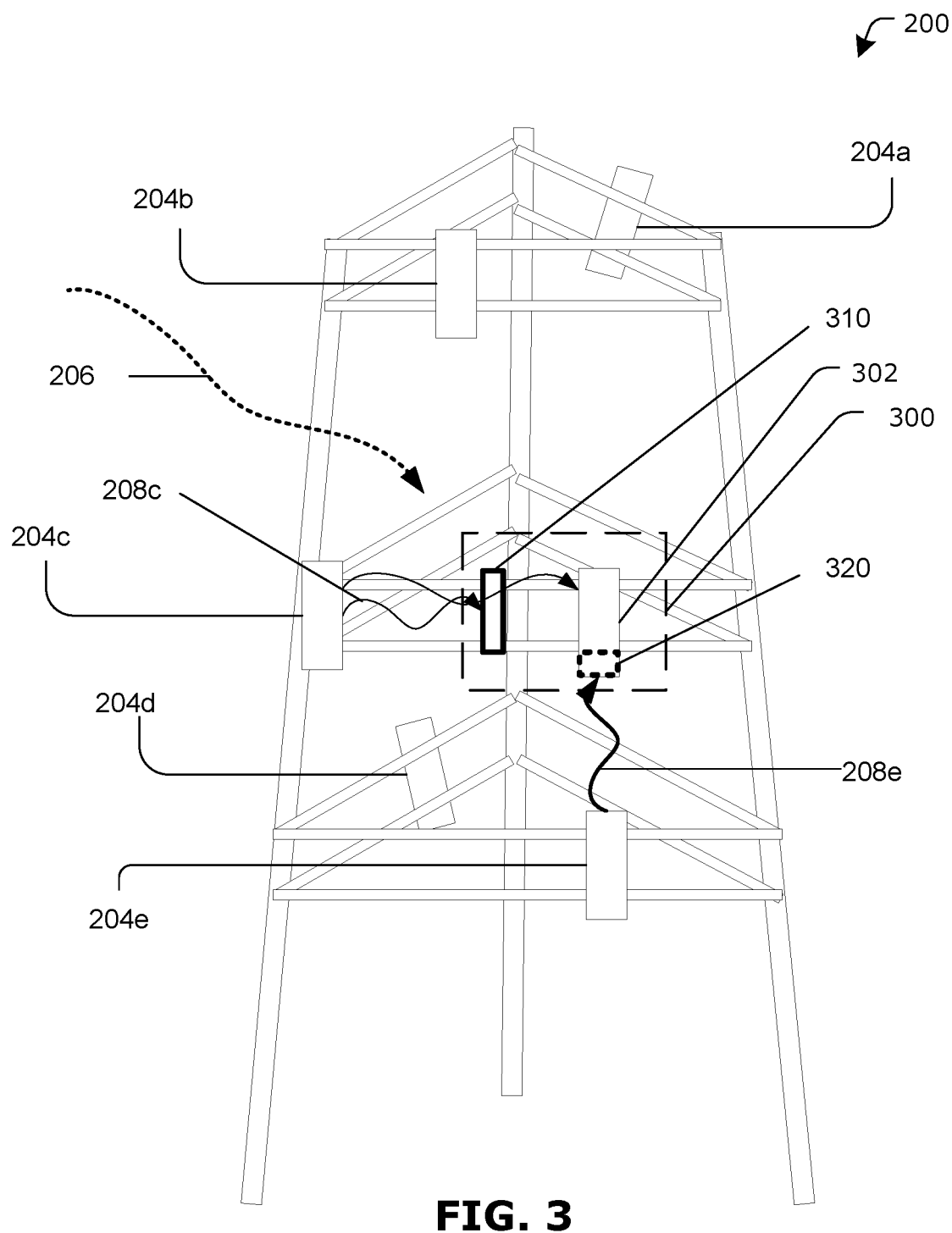
FIG. 3 illustrates an example antenna system, in accordance with examples described herein, located on an antenna tower with interfering transmitters and a first signal.

FIG. 3 shows an example embodiment of the antenna tower 200 with an example of the presently disclosed antenna system installed. The antenna system 300, includes a main antenna 302. The antenna system 300, in an example embodiment, includes a first auxiliary antenna 310 (also referred to as a peripheral antenna) configured to receive the second signal 208c from the direction of the interfering transmitter 204c, shown in bold for clarity. In example embodiments, where the positions of the interference transmitters 204 are unknown, the first auxiliary antenna 310 is configured to receive a possible second signal 208c from the expected direction of the interfering transmitter 204c.

In the embodiment shown, the position of the interfering transmitters 204 relative to the conventional main antenna 302, and therefore the direction of the interference signal(s) (e.g., the signals 208c, 208e) from the interference transmitters, may be known prior to installing the main antenna 302 on the antenna tower 200. The operator of the main antenna 302 may also know the geometric configuration of the main antenna 302 relative to the interference transmitters 204, including a distance between the main antenna 302 and a neighboring interference transmitter 204, the relative angle between the main antenna 302 and a neighboring interference transmitter 204, the frequency upon which the interference transmitters 204 operate, and so forth. These values may be used to configure the adjustment unit and combiner unit (described below).

In example embodiments, the position of the interference transmitters 204 relative to the main antenna 302 may be unknown at the time of the main antenna 302 installation. In such embodiments, the expected interference direction may be the direction, relative to the main antenna 302, that interference transmitters are expected to be installed. In example embodiments, there may be predefined fixed slots for installing antennas on the antenna tower 200, such that the position of any interference transmitter 204 is one of a finite number of pre-determined positions. In example embodiments, the expected interference direction may be determined based on identifying a likely position that an interference transmitter might be installed to serve customers in a region. For example, an expected interference direction may be determined based on the knowledge that a large group of mobile subscribers is active on the north-west side of the antenna tower 200, and an interference transmitter is likely to be installed in one of the available positions on the antenna tower 200 that is closest to the north-west direction.

The first auxiliary antenna 310 is typically positioned to receive the second signal 208c prior to receipt of the second signal 208c by the main antenna 302. The first auxiliary antenna 310 can be positioned, relative to the main antenna 302, to receive the second signal 208c with a higher path gain. In some embodiments, for example, the first auxiliary antenna 310 may receive the second signal 208c with a low gain (e.g., the first auxiliary antenna 310 may not be directed straight towards the interfering transmitter 204c), but the first auxiliary antenna 310 may nonetheless be positioned to receive the second signal 208c prior to the main antenna 302, and the first auxiliary antenna 310 still receives the second signal 208c at a higher signal strength than the main antenna 302. In the embodiment shown, the first auxiliary antenna 310 is placed between the main antenna 302 and the interference transmitter 204c, and in the direct path of the second signal 208c.

In example embodiments, the main antenna 302 is embodied within a full duplex transceiver. The first auxiliary antenna 310 (and possibly one or more additional auxiliary antennas, in other embodiments, such as described further below) in example embodiments is a simplex receiver, and may be relatively inexpensive owing to the limited functionality, which may allow for a low cost means of improving unwanted signal mitigation/cancellation.

In some embodiments, a second auxiliary antenna 320 (shown as a dotted, bolded box for clarity) is co-located with the main antenna 302, as shown in FIG. 3. For example, the second auxiliary antenna 320 may be on the same reflector as the main antenna 302. The relative placement of the second auxiliary antenna 320 within the main antenna 302 housing may be configured such that the second auxiliary antenna 320 is positioned, relative to the main antenna 302, to receive a stronger third signal 208e from interference transmitter 204e. In example embodiments, the second auxiliary antenna 320 is attached to a side port (not shown) of the main antenna 302.

In the example embodiments shown in FIG. 3, the second auxiliary antenna 320 is positioned to receive a third signal 208e from a second expected interference direction (in this case, the direction of interfering transmitter 204e). In example embodiments, the second auxiliary antenna 320 is positioned, relative to the main antenna 302 and relative to the first auxiliary antenna 310, to receive a stronger third signal 208e. This may be accomplished by means of physical proximity for example, or this may be accomplished through beamforming where the second auxiliary antenna 320 is directed towards the third signal 208e.

The antenna system described herein may use the main antenna 302 and any number of auxiliary antennas. In example embodiments, the operator of the antenna system 300 may not have access to the interfering signals (for example, where the transmitting antennas are operated by different service providers), or it is not convenient for the main antenna 302 to be provided with or to have access to the interfering (or unwanted) signals. The present application does not require that the antenna system have access to the contents of the interfering (or unwanted) signals.

Figure 4A:
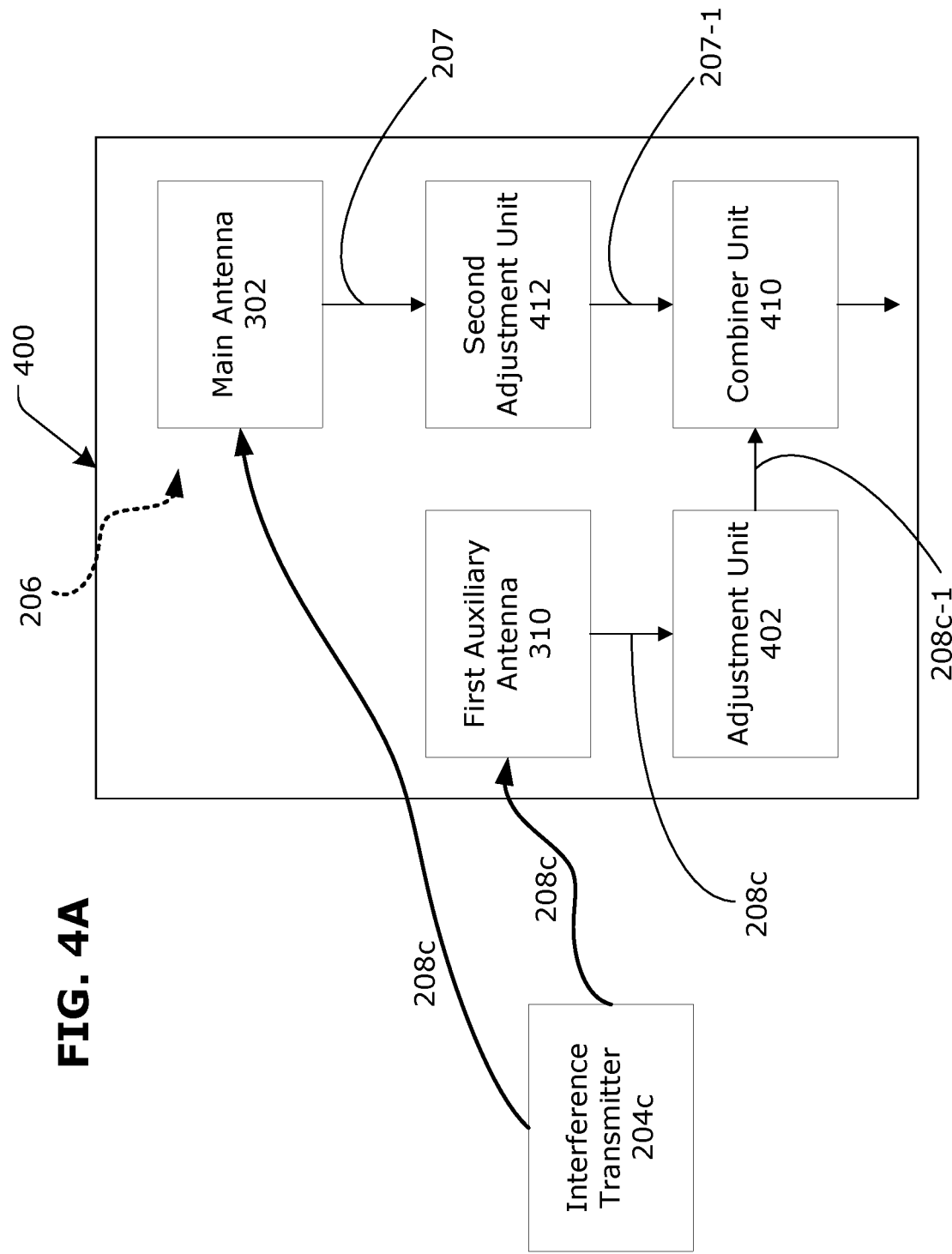
FIG. 4A is a schematic diagram illustrating an example architecture for an antenna system with a first auxiliary antenna.

Referring now to FIG. 4A, an example embodiment of the antenna system 400 is shown. The antenna system 400 is an embodiment of the antenna system 300 of FIG. 3, having a first auxiliary antenna. The antenna system 400 includes the main antenna 302, and the first auxiliary antenna 310. The second signal 208c is generated by the interference transmitter 204c, and received by the main antenna 302 and the first auxiliary antenna 310. The main antenna also receives the desired signal 206. The summation of all of the signals received by the main antenna 302 is referred to herein as the "first signal", which may be composed of any combination of the second signal 208c and the desired signal(s) 206. In some embodiments the first signal is composed of contributions from each of the desired signal 206, the second signal 208c and a reflection of a signal transmitted from main antenna 302 which is operating in a full duplex mode.

The first auxiliary antenna 310 is in communication with the adjustment unit 402, and communicates the second signal 208c to the adjustment unit 402 after receiving it. The first auxiliary antenna 310 can be configured to be in communication with an adjustment unit 402 via a wired connection, or wirelessly. In example embodiments, the wired connection between the first auxiliary antenna 310 and the adjustment unit 402 is a conductor (not shown) having a length that causes the second signal 208c to be received at the adjustment unit 402 as a delayed second signal 208c having a time delay, based on the length of the conductor. The adjustment unit 402 applies further adjustments to the second signal 208c (as discussed further below), to output an adjusted second signal 208c-1

The main antenna 302 in the shown embodiment communicates the received first signal 207 (which may contain components of the interfering second signal 208c as well as the desired signal 206) to a second adjustment unit 412 (e.g., a time delay unit). In example embodiments, the main antenna 302 is configured to send the received first signal to a combiner unit 410, which may include the second adjustment unit 412. In example embodiments, the second adjustment unit 412 is a conductor having a length that causes the first signal 207 to be received at the combiner unit 410 as a delayed first signal 207-1 having a time delay, based on the length of the conductor.

The second adjustment unit 412 is configured to apply a time delay to the first signal 207 based on the relative position of the main antenna 202 and the first auxiliary antenna 310, and based on any time delays introduced by the processing performed at the adjustment unit 402 (discussed further below). For example, where the main antenna 302 and the first auxiliary antenna 310 are positioned such that the main antenna 302 is expected to receive the second signal 208c 10 milliseconds after the first auxiliary antenna 310 receives the second signal 208c, the adjustment unit 402 may time shift the second signal 208c received from the first auxiliary antenna 310 10 milliseconds (in addition to the known delay of transmitting the second signal 208c from the first auxiliary antenna 310 to the adjustment unit 402.) Where the optional second adjustment unit 412 applies a time delay to the first signal 207, time delay adjustments may not need to be carried out by adjustment unit 402 on the second signal 208c, and vice versa.

The adjustments carried out by the adjustment unit 402 are intended to create a signal that can be used to mitigate the effects of interference associated with signal 208c. In some embodiments the output of adjustment unit 402 is used to cancel a portion of the signal received by the main antenna 302 corresponding to the unwanted interference signal (in the example embodiment, the second signal 208c) received by the first auxiliary antenna 310. For example, the adjustment unit 402 may adjust the second signal 208c such that the adjusted second signal 208c-1 that is received at the combiner 410 (discussed below) is 180° out of phase with a delayed first signal 207-1 also received at the combiner 410. In other embodiments, adjustment unit 402 may introduce a time delay to compensate for a time difference associated with the reception of the interfering signal at the main antenna 302. It will also be understood that adjustment unit 402 may ensure that adjusted second signal 208c-1 is attenuated in comparison to the received signal to account for differences in known or assumed distances between the interference transmitter 204c and each of the first auxiliary antenna 310 and the main antenna 302.

In example embodiments, the adjustment unit 402 adjusts the second signal 208c by applying a phase shift. For example, the adjustment unit 402 may include a phase shifter (discussed further below). The phase shifter may adjust the second signal 208c received by the first auxiliary antenna 310 based on the relative position of the main antenna 302 and the first auxiliary antenna 310, similar to the scenario described above with respect to the second adjustment unit 412. For example, the position of the first auxiliary antenna 310 relative to the main antenna 202 is known, such that the time difference between the time that the second signal 208c arrives at the first auxiliary antenna 310 and the time that the second signal 208c arrives at the main antenna 302 is known. The time required for signals to travel to the combiner unit 410 and any time delay introduced by the adjustment units 402, 412 can also be known (e.g., through empirical measurements). Accordingly, it is possible to determine the appropriate amount of phase shift that should be applied by the adjustment unit 402 such that the adjusted second signal 208c-1 is aligned or 180° out of phase with the interfering component in the delayed first signal 207-1, to enable cancellation or mitigation of the interfering component at the combiner unit 410.

In example embodiments, adjustment unit 402 includes a gain unit (not shown). The gain unit may adjust the second signal 208c received by the first auxiliary antenna 310 based on the relative position of the main antenna 202 and the first auxiliary antenna 310. As noted above, this gain adjustment will typically be an attenuation. The strength of a received signal is typically correlated to the distance the signal is propagated. Because an interfering signal (e.g., the second signal 208c) travels a known distance between the main antenna 302 and the first auxiliary antenna 310, this information can be used to calculate an approximation of the decrease in signal strength of the interfering signal received at the main antenna 302 compared to the signal strength received at the first auxiliary antenna 310.

The adjustment unit 402 can be configured to receive and to apply adjustments to signals from any number of auxiliary antennas. In example embodiments in which the antenna system 400 has two or more auxiliary antennas (e.g., as described with reference to FIG. 4B below), each auxiliary antenna may be coupled to an independent respective adjustment unit in order to apply adjustments, as described above, or in example embodiments multiple auxiliary antennas may be coupled to a signal adjustment unit. The adjustment applied to the signal received by each respective auxiliary antenna may be tailored to each auxiliary antenna.

The output of the adjustment unit 402 is the adjusted second signal 208c-1, which is the second signal 208c with adjustments applied by the adjustment unit 402, for example using one of or any combination of the above described phase shifter, gain shifter or second adjustment unit. The adjusted second signal 208c-1 is provided to the combiner unit 410. The combiner unit 410 also receives the delayed first signal 207-1 that is outputted by the second adjustment unit 412.

In example embodiments, at least one of the signals received by an auxiliary antenna 402 is not adjusted, for example where the configuration of the antenna system 400 is such that the interfering signal received by the auxiliary antenna 402 would arrive at the combiner unit 410 out of phase with the interfering component of the signal from the main antenna 302.

For simplicity, FIG. 4A will be described with respect to the embodiment shown, having one first auxiliary antenna 310. The first auxiliary antenna 310, as discussed above, receives the second signal 208c. However, the first auxiliary antenna 310 may also receive some portion of the desired signal 206 (for simplicity FIG. 4A does not show the desired signal 206 being received at the first auxiliary antenna 310). There is a risk that using the signal received at the first auxiliary antenna 310 to cancel/mitigate a component of the signal received at the main antenna 302, as described above, might remove some of the desired signal 206. However, the position of the first auxiliary antenna 310 and the main antenna 302 relative to the interfering second signal 208c and the desired signal 206 may be such that the ratio of received interfering signal at the first auxiliary antenna 310 to the desired signal 206 received at the first auxiliary antenna 310 is high enough that any inadvertent nulling or reduction of the desired signal 206 through combining the delayed first signal 207-1 with the adjusted second signal 208c-1 at the combiner unit 410 is avoided. It should also be understood that implementations may provide for physical shielding that further attenuates the reception of signal 206 at first auxiliary antenna 310.

An example implementation of the antenna system 400 of FIG. 4A will now be described in detail. It should be understood that this is provided only for illustration and is not intended to be limiting. Consider an example arrangement in which the main antenna 302 is configured to mainly receive a desired signal 206 from a service provider (or user equipment (UE)) (not shown), and the first auxiliary antenna 310 is configured to mainly receive an interfering second signal 208c from a neighboring interference transmitter 204c that is offset by 90° from the service provider from the perspective of the antenna system 400. In the example implementation, the main antenna 302 is configured with a gain of +6 dBi at a receive angle of 0° (in the direction of the service provider) and a gain of −15 dBi at a receive angle of 90° (in the direction of the interference transmitter 204c); the first auxiliary antenna 310 is configured with a gain of −20 dBi at a receive angle of 0° (in the direction of the service provider) and a gain of +10 dBi at a receive angle of 90° (in the direction of the interference transmitter 204c). Assume a scenario in which the distance between the main antenna 302 to the service provider is 32 m, and the spacing between the main antenna 302 and the interference transmitter 204c is 2 m; and the transmit power of the service provider is 27 dBm, and the transmit power of the interference transmitter 204c is 40 dBm. Under this scenario, simulations show that the main antenna 302 receives the interfering second signal 208c at 25 dB lower power than the first auxiliary antenna 310. Further, simulations show that the main antenna 302 receives the desired signal 206 at 27 dB greater power than the first auxiliary antenna 310. In other words, the power of the interfering second signal 208c received at the first auxiliary antenna 310 is greater than the power of the interfering second signal 208c received at the main antenna 302; conversely, the power of the desired signal 206 received at the main antenna 302 is greater than the power of the desired signal 206 received at the first auxiliary antenna 310. This enables cancellation/mitigation of the interfering component at the combiner unit 410, as described above, without unacceptable reduction in the power of the desired signal 206.

Figure 4B:
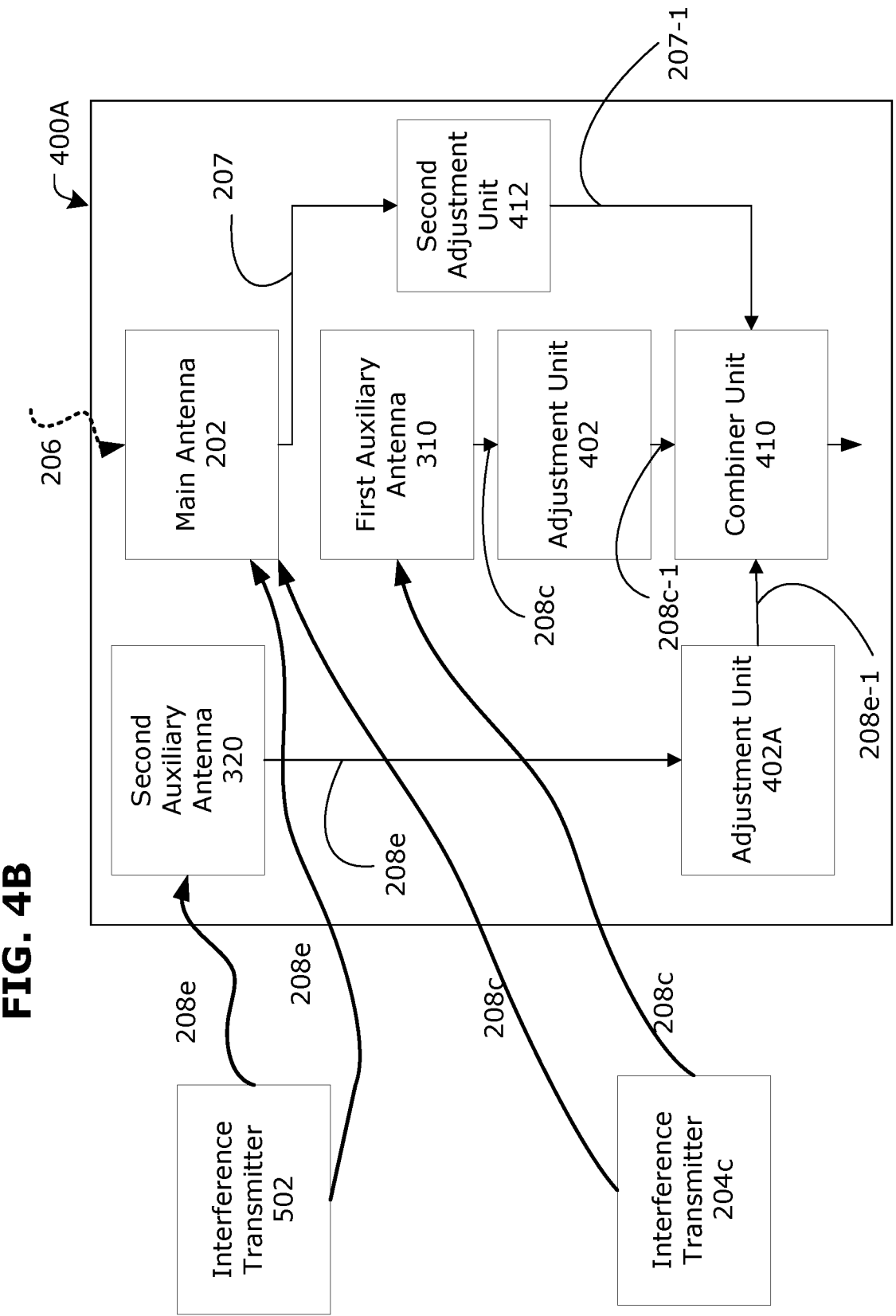
FIG. 4B is a schematic diagram illustrating an example architecture for an antenna system with a first and a second auxiliary antenna.

FIG. 4B shows another example antenna system 400A that includes a main antenna 302, a first auxiliary antenna 310 and a second auxiliary antenna 320. It should be understood that the illustrated geometry is provided for explanatory reasons, and should not be considered as limiting. The second auxiliary antenna 320 may be configured to primarily receive interfering signals from another interference transmitter 502. In the example embodiment shown, another adjustment unit 402A is in communication with the second auxiliary antenna 320 to receive a third signal 208e from the second auxiliary antenna 320 and output an adjusted third signal 208e-1. Although not shown, the signal received by the second auxiliary antenna 320 may include a combination of the third signal 208e and the desired signal 206. As discussed above, the ratio of the received interfering signal (in this case the third signal 208e) to the desired signal 206 received by the second auxiliary antenna 320 is high enough that inadvertent nulling of the desired signal 206 when the adjusted third signal 208e-1 is combined with the adjusted second signal 208c-1 and the delayed first signal 207-1 at the combiner unit 410.

The adjustment unit 402A may be configured similarly to the adjustment unit 402. The adjustments carried out by the adjustment unit 402A are intended to mitigate/cancel the portion of the signal received by the main antenna 202 which corresponds to the unwanted the third signal 208c received by the second auxiliary antenna 320.

Generally, the combiner unit 410 may receive any number of adjusted signals for combination with a time delayed first signal originating from the main antenna 202. For example, referring to FIG. 4B, the combiner unit 410 may receive the adjusted signal from adjustment unit 402A, which is the adjusted third signal 208e-1, and an adjusted second signal 208c-1 from the adjustment unit 402, similar to the example of FIG. 4A described above. Additionally, the combiner unit 410 receives the delayed first signal 207-1 outputted by the second adjustment unit 412.

Combiner unit 410 combines all of the signals received from the various sources. For example, the combiner unit 410 may sum the adjusted second signal 208c-1 with the delayed first signal 207-1, in the case where the adjusted second signal 208c-1 has been adjusted to be 180 out of phase with the undesired interference in the first signal. In another example, the combiner unit 410 may subtract the adjusted second signal 208c-1 from the delayed first signal 207-1, in the case where the adjusted second signal 208c-1 has been adjusted to align the phase with the interference in the first signal. In the example embodiment of FIG. 4B, for example, combiner unit 410 combines the adjusted signals received from the main antenna 302, the first auxiliary antenna 310 and the second auxiliary antenna 320 (e.g., by summation). The output of the combiner unit 410 is a combined signal in which the content contributed by the undesired interfering second signal 208c and third signal 208e has been reduced. The output of the combiner unit 410 may be provided as an input to a further cancellation system such as one that may be used to implement Full Duplex communication. In such situations, the output of combiner unit 410 is typically an analog signal. In other implementations, such as those where no further cancellation is necessary, the combiner unit 410 may provide a digitized combined signal as its output for further transmission.

In example embodiments, the adjustment units for auxiliary antennas may be collocated with a combiner unit and/or an auxiliary antenna. For example, adjustment units 402 and 402A may be collocated with combiner unit 410, such that only a conductor from each of the auxiliary antennas 310, 320 to the combiner unit 410 are needed. In example embodiments, some but not all of the adjustment units are collocated with the combiner unit 410. There may be space limitations on an antenna system 400A such that the adjustment unit 402 and the combiner unit 410 are collocated, or the adjustment unit 402A and the second auxiliary antenna 320 are collocated, with a conductor connecting the second auxiliary antenna 320 to the combiner unit 410.

Figure 5:
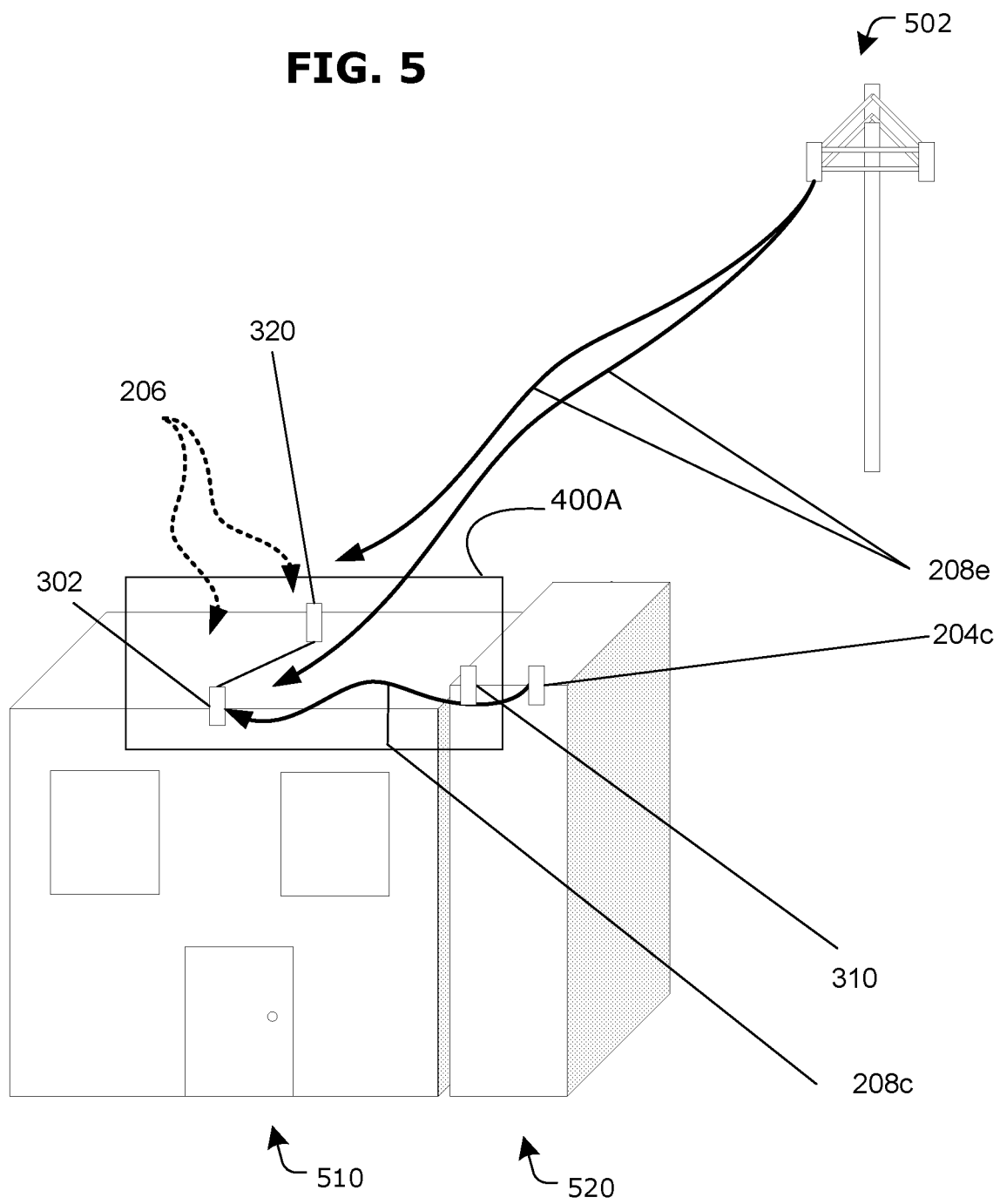
FIG. 5 illustrates an example antenna system located on a building, suitable for implementing examples described herein.

Referring now to FIG. 5, another example of the disclosed antenna system 400A is shown. In this example, the main antenna 302 is shown as located on top of a building 510. The main antenna 302 and the first and second auxiliary antennas, 310 and 320 respectively, may be located on any structure suitable for installing antennas. In the embodiment shown, the first auxiliary antenna 310 is located on a building 520 that is different from the building 510 upon which the main antenna 302 and the second auxiliary antenna 320 are installed. It will be understood that the distances between each of the main antenna, the first auxiliary antenna, the source of the interference signal should be known to allow for coordination of the adjustment functions. The distance between the main antenna and a remote auxiliary antenna is limited by the ability to provide the interference signal, or the cancellation signal associated with the received interference signal, to the adjustment unit or combiner without undue delay being needed at the antenna system 400. In example embodiments, the first and second auxiliary antennas, 310 and 320 respectively, and the main antenna 302 are located on separate buildings, but in communication with the adjustment unit 402 and/or the combiner unit 410 (not shown).

The interfering third signal 208e may originate from structures other than the structure(s) which support the main antenna 302 and the auxiliary antennas 310, 320. In the embodiment shown in FIG. 5, the third signal 208e originates from an interference source 502, located on a structure not adjacent to the main antenna 302. The second auxiliary antenna 320 is installed on the building 510, however it is not in the direct signal path between the interference source 502 and the main antenna 302. The second auxiliary antenna 320 is in either wired or wireless communication with the adjustment unit 402, which may be located on the building 510 or the building 520. The second signal 208c, generated by the interference transmitter 204c, is received by the first auxiliary antenna 310. The first auxiliary antenna 310 is in either wired or wireless communication with the adjustment unit 402. The operation of the adjustment unit 402 and the combiner unit 410 to cancel/mitigate inference is similar to that described above. It should be understood that the auxiliary antenna associated with an interference signal should be located so that it receives the interference signal with a substantially higher signal strength than it would receive the intended signal. If the auxiliary antenna is co-located with the main antenna, it relies upon directionality to ensure the sufficiently stronger signal strength. The further from the interference source the auxiliary antenna co-located with the main antenna is, the more difficult it will be to implement the adjustment unit.

Figure 6:
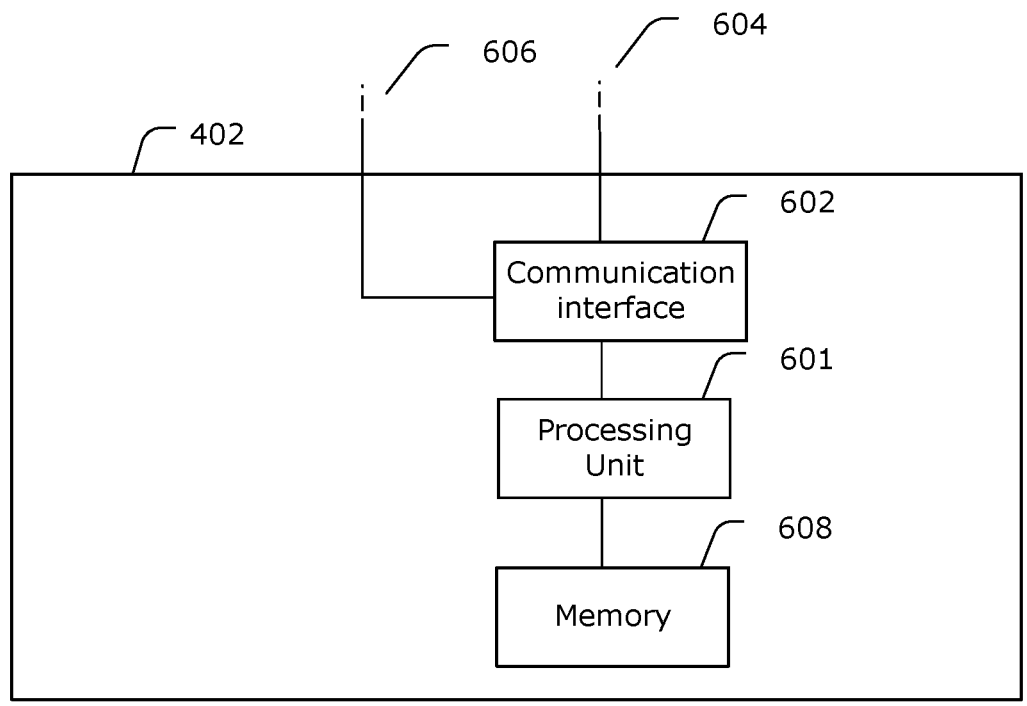
FIGS. 6 & 7 are schematic diagrams illustrating example architectures for an adjustment unit of the antenna system.
Figure 7:
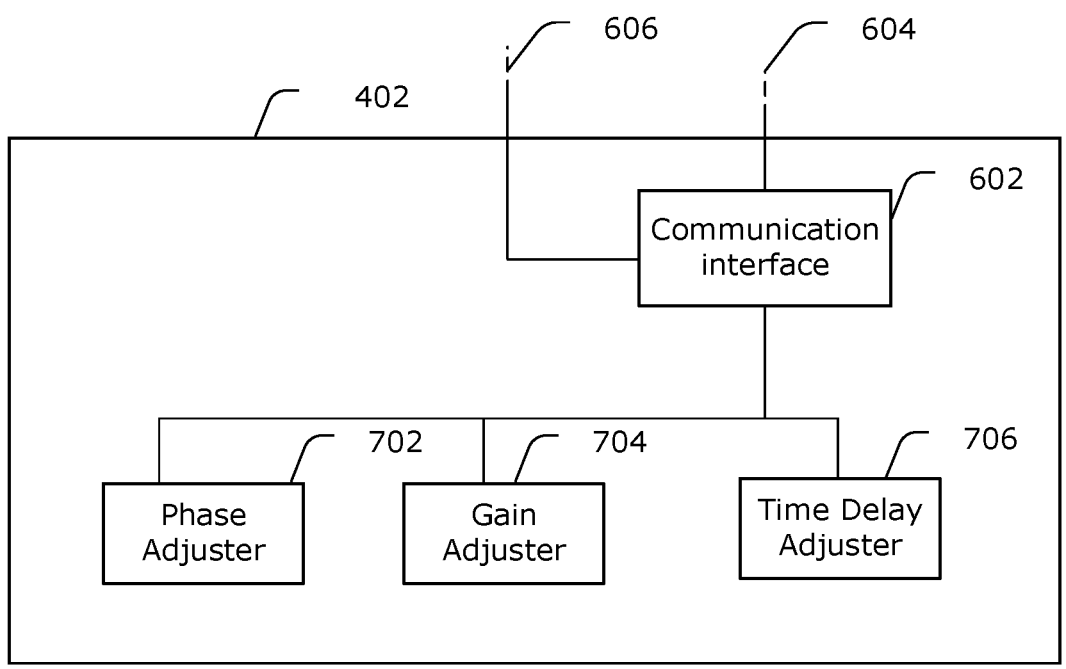

In general, the adjustment unit 402 may be implemented digitally or using analog components, for example. FIG. 6 illustrates an example adjustment unit 402 configured to perform adjustments using a digital processor. FIG. 7 illustrates an example adjustment unit 402 configured to perform adjustments using analog circuitry.

As shown in FIG. 6, in an example digital implementation, the adjustment unit 402 includes at least one processing unit 601. The processing unit 601 implements various processing operations of the adjustment unit 402. For example, the processing unit 601 could perform gain adjustment, signal phase shifting, and/or signal time delay shifting on the signals received, or any other functionality of the adjustment unit 402. The processing unit 601 may also be configured to implement some or all of the functionality and/or embodiments described in more detail herein. Each processing unit 601 includes any suitable processing or computing device configured to perform one or more operations. Each processing unit 601 could, for example, include a microprocessor, microcontroller, digital signal processor, field programmable gate array, or application specific integrated circuit. It should be understood that such a digital implementation would be suitable for use in a system in which no further analog cancellation, such as those appropriate for many full duplex cancellation methods, is to be implemented.

The example adjustment unit 402 of FIG. 6 also includes at least one communication interface 602 for wired and/or wireless communications. Each communication interface 602 includes any suitable structure for generating signals for wireless or wired transmission and/or processing signals received wirelessly or by wire. The adjustment unit 402 in this example includes at least one input connection 606, which is a wired connection, shown as a dotted line (in other examples, an antenna may be used). Each connection 606 can include any suitable structure for transmitting and/or receiving wireless or wired signals. One or multiple communication interfaces 602 could be used in the adjustment unit 402, for example leading to each of the first and second auxiliary antenna, 310 and 320, respectively. One or more connections 606 could be used in the adjustment unit 402.

The adjustment unit 402 may further include one or more output connectors 604. The output connector(s) 606 permit interaction with the combiner unit 410, which may be collocated on a main antenna along with the adjusting unit 402.

The adjustment unit 402 includes at least one memory 608. The memory 608 stores instructions and data used, generated, or collected by the adjustment unit 402. For example, the memory 608 could store software instructions or modules configured to implement some or all of the functionality and/or embodiments described herein and that are executed by the processing unit(s) 601. Each memory 608 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 7, in an example analog implementation, the adjustment unit 402 may be configured to perform adjustments using analog circuitry. In the example embodiment shown, the adjusting unit 402 includes a phase adjuster 702, a gain adjuster 704, and a time delay adjuster 706. The adjustment unit 402 may include any circuitry element which performs predefined adjustments to the signals received, whether via the communication interface 602 or otherwise. The adjustment unit 402 may include any one of or any combination of the above described elements. For example, adjustment unit 402 may solely contain a phase adjuster 702.

In example embodiments adjustment unit 402 may not include the communication interface 602, and the signal received may be communicated directly to an adjusting element such as the phase adjuster 702 via the connector 604; the signal outputted by the adjustment unit 402 may be similarly directly outputted from an adjusting element via the connector 606.

Figure 8:
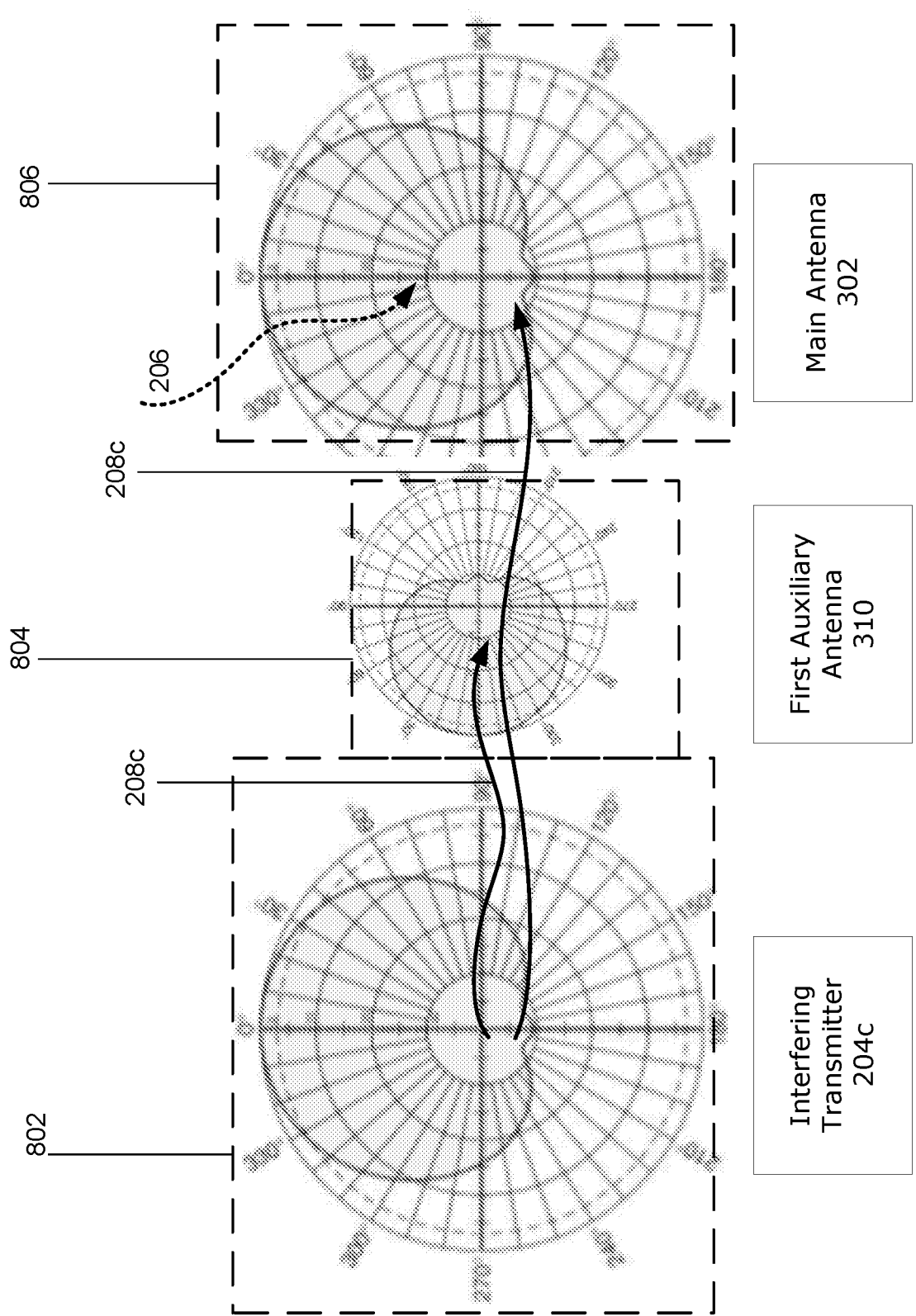
FIG. 8 is a schematic diagram illustrating an example antenna system polarization architecture and associated radiation patterns.

Referring now to FIG. 8, the interfering transmitter 204c, the first auxiliary antenna 310, and the main antenna 302 are shown. FIG. 8 also shows polar plots 802, 804 and 806 representing the radiation pattern gain of the respective antennas. In the shown embodiment, the interference transmitter 204c transmits a second signal (an unwanted interference signal) 208c which is received by both the first auxiliary antenna 310 and the main antenna 302.

In the example embodiment shown, the main antenna 302 gain in the direction of the interfering signal is lower than a gain of a desired signal received in the 0° direction, as shown in plot 806. Nevertheless, the main antenna 302 receives some interference from the second signal 208c in addition to the desired first signal 206. The main antenna 302 may receive an unwanted signal from any direction other than the direction of highest gain of main antenna 302 and still operate in accordance with the present application. In contrast to the main antenna 302, the first auxiliary antenna 310 has a maximum gain directed towards the expected interference from the second signal 208c, as shown in plot 804. In the shown configuration, the first auxiliary antenna 310 will receive a stronger second signal 208c (also referred to as having a greater path gain) compared to the main antenna 302. In example embodiments, the gain of the first auxiliary antenna 310 may not be directed towards the second signal 208c (not shown), however the first auxiliary antenna 310 may still be capable of receiving the second signal 208c at a higher path gain than the main antenna 302.

The main antenna 302 and the first auxiliary antenna 310 may be configured in such as manner so that the first auxiliary antenna 310 has the highest gain direction, or a majority of the gain direction, directed away from the desired first signal 206, and the main antenna 302 is directed away from the interfering second signal 208c, so that possibly inadvertent cancellation of the first signal via combination with the adjusted second signal, as discussed above, is minimized or avoided.

In some embodiments, for example, the first auxiliary antenna 310 has a path gain in the direction of the second signal 208c greater than that of the main antenna 302. The adjusting unit 402 is, in this scenario, configured to adjust the second signal 208c received at the first auxiliary antenna 310 by lowering its magnitude, so that when the adjusted second signal 208c is combined in combiner unit 412 (described above) with the first signal received by the main antenna 302, there is no overcorrection.

In example embodiments, the main antenna 302 may be an antenna array, and the first auxiliary antenna 310 may be an array element of the main antenna 302. The antenna array may be used to perform beamforming and beam steering operations. In such embodiments, the antenna system may omit the first auxiliary antenna 310. Instead, the function of the first auxiliary antenna 310 may be implemented using a side lobe formed by beamforming operations, as discussed below.

Figure 9:
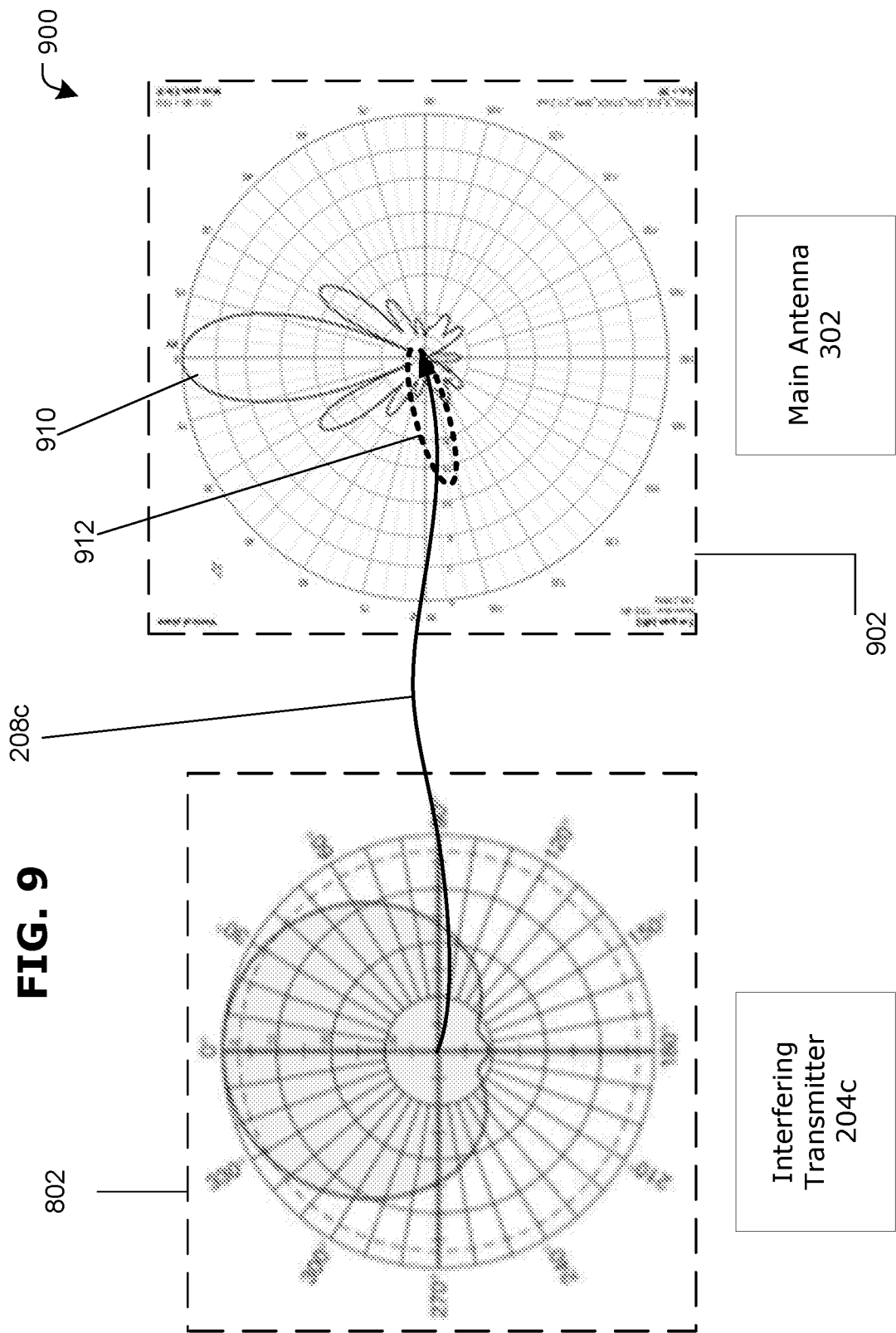
FIG. 9 is a schematic diagram illustrating an example antenna system polarization architecture and associated radiation patterns.

Referring now to FIG. 9, in example embodiments, an antenna system 900 may include a single antenna array as the main antenna 302. The antenna system 900 includes an adjustment unit and a combiner unit (not shown) connected to the main antenna 302 as described in FIG. 4A, and may also include any further elements as discussed above in relation to FIGS. 4A and 4B. The main antenna 302 can be configured to produce, via beamforming, a main receiving lobe 910, and an interference receiving lobe 912 directed towards different locations, as shown in polar plot 902.

In the example embodiment shown, the main receiving lobe 910 is directed towards an intended signal to be received, while the interference receiving lobe 912 is directed towards the interfering second signal 208c.

The main antenna 302 is in communication with an adjustment unit 402 (see FIG. 7) comprising at least a gain adjuster 704, wherein the gain adjuster 704 adjusts the gain from the second signal 208c received by the interference receiving lobe 912 such that the adjusted second signal 208c, when combined with the signal received by the main receiving lobe 910, results in mitigation/cancellation of the interfering content in the desired intended signal.

The adjustment unit 402 and the main antenna 302 may be collocated (e.g., on the same antenna base). In example embodiments, the adjustment unit 402, the combiner unit 412 and the main antenna 302 are all collocated.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. An antenna tower system comprising:
a main antenna, configured to receive a first signal at the antenna tower;
an interfering transmitter antenna configured to transmit a second signal from the antenna tower;
a first auxiliary antenna, configured to receive the second signal in a first expected interference direction associated with the interfering transmitter antenna;
an adjustment unit in communication with the first auxiliary antenna to receive the second signal and configured to adjust the second signal; and
a combiner unit, in communication with the main antenna and the adjustment unit, the combiner unit being configured to combine the adjusted second signal with the first signal, to reduce a contribution of the second signal to the first signal.

2. The antenna tower system of claim 1, wherein the first auxiliary antenna is positioned between the interfering transmitter antenna and the main antenna.

3. The antenna tower system of claim 1, further comprising a second adjustment unit, wherein the second adjustment unit is in communication with the main antenna to receive the first signal, and adjusts the first signal, prior to providing the first signal to the combiner unit.

4. The antenna tower system of claim 1, wherein the main antenna is an antenna array and the first auxiliary antenna is an array element of the main antenna.

5. The antenna tower system of claim 1, wherein the main antenna is a duplex transceiver and the first auxiliary antenna is a receiving antenna.

6. The antenna tower system of claim 1, wherein the adjustment unit is configured to adjust the second signal by applying a phase shift to the second signal based on a distance between the main antenna and first auxiliary antenna.

7. The antenna tower system of claim 1, wherein the adjustment unit is configured to adjust the second signal by applying a gain adjustment to the second signal based on a distance between the main antenna and first auxiliary antenna.

8. The antenna tower system of claim 1, wherein the adjustment unit is configured to adjust the second signal by applying a time delay to the second signal based on a distance between the main antenna and first auxiliary antenna.

9. The antenna tower system of claim 1, wherein the adjustment unit comprises a gain unit, a phase shifter, and a delay unit.

10. The antenna tower system of claim 1, wherein the adjustment unit is configured to adjust the second signal based on a distance between the main antenna and the first auxiliary antenna.

11. The antenna tower system of claim 1, wherein the first signal is communicated to the combiner via a length of connector that causes the first signal to be received at the combiner as a delayed first signal having a time delay, the time delay of the delayed first signal being selected to cause the adjusted second signal to be reduced from the delayed first signal when combined.

12. The antenna tower system of claim 1, wherein the first auxiliary antenna is directed towards the first expected interference direction and away from an expected source of the first signal.

13. The antenna tower system of claim 1, wherein the adjustment unit and the combiner unit are collocated.

14. The antenna tower system of claim 1, wherein the fit auxiliary antenna is attached to a sideport of the main antenna.

15. A antenna positioned on an antenna tower, the antenna comprising:
- an antenna array;
- a control unit in communication with the antenna array, the antenna array being configured by the control unit to produce a main receiving lobe and an interference receiving lobe, the main receiving lobe being directed to receive a first signal, the interference receiving lobe being directed to receive a second signal in a first expected interference direction from an interfering transmitter antenna of the antenna tower;
- an adjustment unit in communication with the antenna array, and configured to receive and adjust the second signal; and
- a combiner unit in communication with the adjustment unit and the antenna array, and configured to combine the adjusted second signal with the first signal, to reduce a contribution of the second signal to the first signal.

16. The antenna tower of claim 15, where the adjustment unit, the control unit and the combiner unit are collocated.

17. The antenna tower of claim 15, wherein the adjustment unit comprises at least a gain unit configured to apply a gain adjustment to the second signal based on a distance between the main antenna and first auxiliary antenna.

18. The antenna tower of claim 15, wherein the adjustment unit comprises a phase shifter configured to apply a phase shift to the second signal based on a distance between the main antenna and first auxiliary antenna.

19. The antenna tower of claim 15, wherein the adjustment unit comprises a delay unit configured to apply a time delay to the second signal based on a distance between the main antenna and first auxiliary antenna.

20. The antenna tower of claim 15, wherein the interference receiving lobe is directed towards a first expected interference direction associated with the interfering transmitter antenna of the antenna tower and away from an expected source of the first signal.

* * * * *

UNITED STATES PATENT AND TRADEMARK OFFICE
CERTIFICATE OF CORRECTION

| | |
|---|---|
| PATENT NO. | : 11,128,432 B2 |
| APPLICATION NO. | : 16/585132 |
| DATED | : September 21, 2021 |
| INVENTOR(S) | : Watson et al. |

It is certified that error appears in the above-identified patent and that said Letters Patent is hereby corrected as shown below:

In the Claims

Claim 14, Column 17, Line 7; delete "fit" and insert --first--.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*